Aug. 16, 1927.
H. C. GARDINER
TIMBER PRESERVATION
Original Filed July 18, 1925
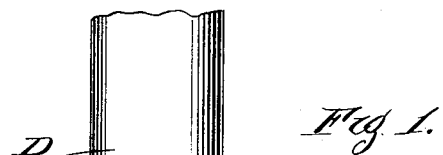
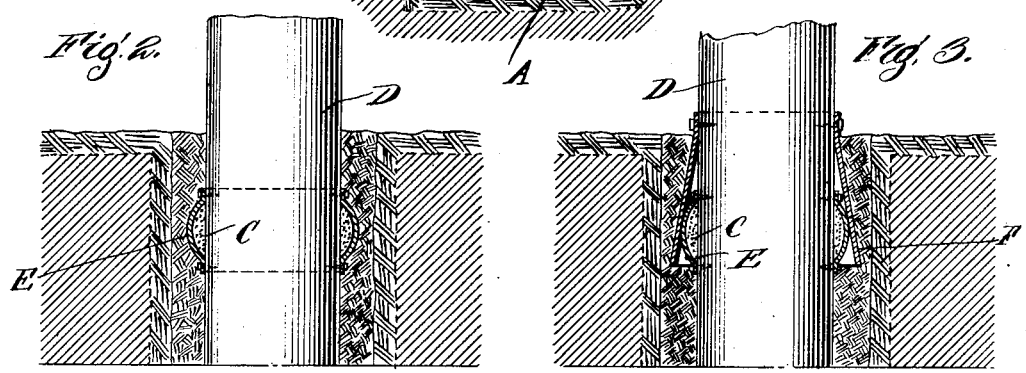
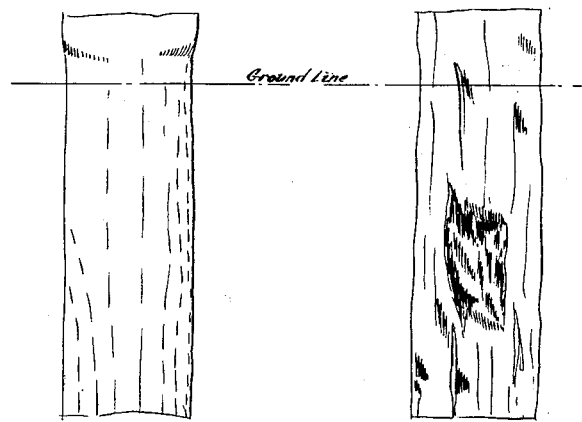
WITNESSES
INVENTOR
Henry C. Gardiner
BY
ATTORNEYS Patented Aug. 16, 1927.

1,639,601

UNITED STATES PATENT OFFICE.

HENRY C. GARDINER, OF ANACONDA, MONTANA.

TIMBER PRESERVATION.

Substitute for application Serial No. 44,532, filed July 18, 1925. This application filed April 28, 1927. Serial No. 187,255.

This invention relates to a method of timber preservation, and more particularly to the method of timber preservation described in my application Serial #44,532, filed July 18, 1925, of which the present application is a substitute.

The object of the invention is to preserve, that is, to prevent rotting or other analogous destruction of wood, especially telegraph or telephone poles, fence posts and the like, the ends of which are buried in the ground, or are in contact with the soil.

A feature of the invention resides in the provision of a method for the effectual impregnation and preservation of poles, posts, timbers and the like in use, that is, after they have been placed in contact with the ground, thus avoiding the usual separate preservative or impregnation treatment. Another feature of the invention resides in the provision of a method for the gradual and progressive and continued impregnation of the wood of poles, posts, timbers and the like while in use with sterilizing and preservative materials over a period of years.

Still another feature of the invention resides in the preservation of the wood which is buried in the ground, not only by the impregnation and sterilization thereof with preservative material, but also by the sterilization of the soil in contact with and adjacent to or surrounding the wood.

The process consists generally in placing a quantity of solid arsenic-containing materials, either by themselves or in combination with other preservative or reactive materials or both, such as solid chemical compounds or mixtures, organic or inorganic, in contact with that part of the pole, post or timber which is buried in the ground, preferably in the form of a ring or collar surrounding the pole.

In the case of poles of considerable length, one ring or collar of the arsenic-containing compound or composition is placed from six to twenty-four inches below the surface of the ground, and another ring or collar about half way between the first ring and the bottom of the hole. An additional quantity of the material may be placed in the bottom of the hole.

The object of using the several collars of preservative and antiseptic material is to insure by capillary movement of the chemical compounds or mixtures, which become slowly soluble, both up and down the pole, the complete impregnation of the buried portion of the pole and the soil surrounding it.

As a result of the action due to the presence of moisture both in the pole and in the surrounding soil, the arsenic-containing material gradually impregnates the surface of the pole and the cracks or fissures in the wood and the adjacent wood fiber and preserves it and also sterilizes the soil immediately surrounding the pole, thereby making access to the wood of rotting organisms or agencies practically impossible.

A feature of novelty is the addition to the arsenic compounds and other preservative compounds which are either insoluble or only partially soluble, of such materials as will increase or control the solubility thereof, either by attracting moisture or by chemical reaction, forming soluble or partly soluble chemical compounds or mixtures. This feature enables the advantageous results of my invention to be obtained under varying soil conditions and varying conditions of rainfall.

As the main constituent of this preservative and antiseptic compound there may be employed either arsenious or arsenic acid or compounds of arsenic such as the arsenates and arsenites of copper, zinc, lead and sodium; arsenious and arsenic fluorides, arsenic phosphide, and in general any organic or inorganic compounds of arsenic or mixtures containing arsenic.

In order to facilitate and hasten chemical reaction, any one or more of the following chemical compounds or mixtures thereof may be added,—calcium oxide, calcium hydroxide, sodium chloride, sodium carbonate, sodium bicarbonate or sodium hydroxide.

In the attached drawings:

Fig. 1 is an elevation of the embedded portion of a pole showing the position of the preserving material.

Fig. 2 is an elevation of the embedded portion of a pole, illustrating the use of a covering for the collar of preserving material to hold it in place and increase its effectiveness.

Fig. 3 is an elevation of the embedded portion of a pole, illustrating still another method of increasing the effectiveness of the preservative material, particularly applicable for the treatment of poles which have already begun to decay.

Fig. 4 is an attempt to reproduce a photograph of a post still in good condition after being in the ground for four years to which my method had been applied; and Fig. 5 is a like attempt and shows the largely rotten condition of a post of the same wood (lodge-pole pine) subjected to the same conditions, but without the application of my method.

Referring to Fig. 1 of the accompanying drawings, D represents the portion of the post or pole embedded in the ground; A represents a mass of dry, solid, arsenic-containing material at the bottom of the hole; B represents a ring or collar of like material surrounding the hole, and C a second ring or collar surrounding the post or pole a short distance,—from six to twenty-four inches, below the surface of the ground. The preservative material preferably is applied during the setting of the pole, that is, the mass A is introduced into the hole and the pole set in, and then as the hole is filled with soil the two rings B and C are applied by simply pouring the preservative material in dry form around the pole. In the case of shorter articles such as fence posts, the post may be set in the hole in the ground, the dirt filled in and then a chisel bar is jammed down around the post, pressing the dirt back from the post, and approximately half a pound of the arsenic-containing material is placed in the hole and the dirt is then tamped back as would ordinarily be the case in setting the post. With such short articles a single ring of preservative material usually is sufficient.

As is illustrated in Fig. 2, the ring or collar C of preservative material is provided with a covering E of a suitable material such as tarred paper or so-called Rubberoid roofing material which may be secured in place for instance by being tacked to the pole. This more or less impervious covering serves to prevent a too rapid diffusion of the preservative material into the soil surrounding the pole, and to thus increase the impregnation of the pole and to extend the period of impregnation by preventing the loss or too rapid dissipation of the preservative material. This expedient is advisable in cases in which the preservative material is relatively soluble or the soil conditions are such that there is a tendency for the preservative material to diffuse too rapidly into the soil surrounding the pole. The purpose and effect of the covering however is not to completely prevent the diffusion of the preservative and sterilizing material into the soil which, as has been stated, is desirable, but merely to retard or prevent an undesirably rapid diffusion. The amount of material which escapes from the covering either by diffusion through it or by passing through cracks or joints in the covering or both is quite sufficient to accomplish the desired sterilization of the soil in contact with and adjacent the pole.

Fig. 3 illustrates still another method or means of retaining the preservative material in proximity to the pole and preventing its loss by diffusion. As shown, the collar C of preservative material has a covering E of material such as tarred paper or Rubberoid and in addition the skirt F of Rubberoid or similar impervious material extends from above the ground-level down over the collar. The covering C may of course be omitted and only the skirt F employed. This expedient is particularly useful when an especially active impregnation of the pole is desired as in the treatment of poles which have been in the ground for some time and in which decay has already started, and also in cases in which the preservative material is rather soluble under the existing soil conditions or when other conditions such as the porosity of the soil and the rainfall tend to cause a too rapid diffusion of the preservative material away from the pole into the surrounding soil. As is stated above, the purpose is not to entirely prevent but simply to retard or limit the diffusion of the preservative material into the soil.

In Fig. 4 the dotted line indicates the position of the ring of preservative material.

As has been stated, the preservative material preferably is applied during the setting of the pole, but with short articles such as fence posts the preservative material may be applied by simply pressing the dirt back from the set post to a suitable depth, preferably from six to twenty-four inches, by means of a chisel bar, pouring in the desired quantity of preservative material into the hole thus formed and then tamping the dirt back in place. For the treatment of set poles I prefer to dig away the soil around the pole to the desired depth, say from six to twenty-four inches, clean off any decayed wood and then apply the collar of preservative material, either with or without the impervious covering illustrated in Fig. 3. In the treatment of poles which are already set in the ground to a considerable depth, it is of course not feasible to place the preservative material at the bottom of the pole as at A in Fig. 1, and it is also difficult to apply the collar B of preservative material. I prefer to treat such articles by driving a bar down beside the pole to a depth of say from two to six feet corresponding generally to the depth of the collar B, preferably at three or more points around the hole, pouring the preservative material into the holes so formed and then filling them up with dirt. The collar C of preservative material is then applied as described by digging away the soil to a depth of six to twenty-four inches.

The following examples are illustrative of preserving and sterilizing materials suitable for use in connection with my invention:

(1) Pulverulent white arsenic; $As_2O_3$, 90% to 100%.

(2) Sample analysis, $As_2O_3$, 60% to 99%; organic or inorganic chemical compounds of copper, lead, zinc, antimony, iron, calcium and sodium in varying proportions from 39% to 1%.

(3) Sample analysis $As_2O_3$ 30% to 60%; organic or inorganic chemical compounds of copper, lead zinc, antimony, iron, calcium and sodium in varying proportions from 69% to 39%.

(4) Sample analysis $As_2O_3$ 5% to 30%; organic or inorganic chemical compounds of copper, lead, zinc, antimony, iron, calcium and sodium in varying proportions from 94% to 69%.

(5)—(1), (2), (3) or (4) with an addition of 1 to 10% by weight of a chemical compound such as sodium chloride, magnesium chloride, calcium chloride, monocalcium phosphate or other deliquescent chemical compounds for purposes of increasing the solubility by attracting moisture.

(6)—(1), (2), (3) or (4) with an addition of 1 to 10% by weight of a chemical compound such as sodium carbonate or bicarbonate or magnesium chloride or other chemical compounds for the purpose of increasing the solubility of the mixture.

The arsenic component of the compositions may be supplied in the form of pure white arsenic or in the form of a very crude and impure arsenic-containing material such as is produced as a by-product in metallurgical smelting practice. The arsenic content of such material may run from say 10 to 95%. The following is a sample analysis showing the percentages of the principal ingredients of a suitable arsenic-containing material:

|  | Per cent. |
|---|---|
| Arsenic trioxide | 75.2 |
| Copper sulfate | 2.2 |
| Silica | 3.1 |
| Lead arsenate | 3.3 |
| Ferric oxide | 2.6 |
| Aluminum oxide | 1.4 |
| Calcium oxide | 3.2 |
| Lead compounds | 2.4 | and water, zinc oxide, bismuth oxide, selenium oxide, telluric oxide, sulfur, and antimony oxide in quantities less than 1%. It is of course to be understood that the material may contain the various elements in chemical combinations other than those listed in the chemical analysis. Such crude arsenic-containing materials containing mixtures of a variety of elements and compounds have been found to be particularly effective wood preservative agents when applied in accordance with my invention and are moreover very inexpensive.

In arid regions the additional reactive material or chemical compounds or mixtures should be of such character as to absorb moisture. In less arid regions the moisture already in the soil may be sufficient to slowly dissolve any soluble ingredients, while the other added materials will assist in rendering soluble such arsenic compounds as are insoluble or difficultly soluble, or in forming, in the presence of moisture, arsenic compounds which are sufficiently soluble.

I am aware that arsenic compounds have been used to impregnate wood, such methods requiring heating and drying and introduction into the pores of the wood of the arsenical compounds. My method does not require any such separate impregnation, and is applicable to the untreated poles or the like such as are ordinarily used.

While I have, in the claims, specifically referred to arsenic-containing compounds, compounds of other metals such as lead, zinc, copper, fluorine, antimony, calcium, iron or sodium act or may act as equivalents, and are included within the scope of my invention.

I claim:

1. The method of preventing against rot, decay, and insect injury to those portions of the wood in articles such as posts, poles and piles which are buried in the ground which comprises placing in contact with such buried portions a solid pulverulent arsenic-containing material of gradual dissolvability, encasing the arsenic containing material with a relatively pervious covering which will permit gradual seepage of moisture therethrough to provide for a progressive and continuous impregnation of the poles with the arsenic-containing material and to provide for a sterilization of the surrounding soil.

2. The method of preventing against rot, decay, and insect injury to those portions of the wood in articles such as posts, poles and piles which are buried in the ground which comprises placing in contact with such buried portions a solid pulverulent arsenic-containing material of gradual dissolvability, encasing the arsenic-containing material with a relatively pervious covering which will permit gradual seepage of moisture therethrough to provide for a progressive and continuous impregnation of the poles with the arsenic-containing material and to provide for a sterilization of the surrounding soil, and controlling the quantity of moisture to the arsenic-containing material to regulate the impregnation and sterilization.

3. The method of preventing against rot, decay and insect injury to those portions of the wood in articles such as posts, poles and piles which are buried in the ground which comprises placing in contact with such buried portions a solid pulverulent arsenic-containing material of gradual dissolvability, combining reactive material with the arsenic-containing material to control the solubility of the arsenic-compounds, encasing the arsenic-containing material with a relatively pervious covering which will permit gradual seepage of moisture therethrough to provide for a progressive and continuous impregnation of the poles with the arsenic-containing material and to provide for a sterilization of the surrounding soil.

HENRY C. GARDINER.